United States Patent
LaReau et al.

(10) Patent No.: US 10,467,565 B2
(45) Date of Patent: Nov. 5, 2019

(54) SYSTEM AND METHOD FOR WORKPLACE MANAGEMENT

(71) Applicant: Caterpillar Inc., Peoria, IL (US)

(72) Inventors: Ryan J. LaReau, East Peoria, IL (US); Joshua C. Edwards, Washington, IL (US); Joseph B. Doeden, Peoria, IL (US); Joseph D. Tauke, East Peoria, IL (US); William J. McMilleon, Jr., East Peoria, IL (US); Joel B. Bagley, Bloomington, IL (US); Andrew J. Swanson, Peoria, IL (US)

(73) Assignee: Catepillar Inc., Peoria, IL (US)

( * ) Notice: Subject to any disclaimer, the term of this patent is extended or adjusted under 35 U.S.C. 154(b) by 669 days.

(21) Appl. No.: 15/077,092

(22) Filed: Mar. 22, 2016

(65) Prior Publication Data

US 2017/0278041 A1    Sep. 28, 2017

(51) Int. Cl.
*G06Q 10/00* (2012.01)
*G06Q 10/06* (2012.01)

(52) U.S. Cl.
CPC .......................... *G06Q 10/063114* (2013.01)

(58) Field of Classification Search
CPC ............................................ G06Q 10/00–50/00
See application file for complete search history.

(56) References Cited

U.S. PATENT DOCUMENTS

| | | | |
|---|---|---|---|
| 7,504,949 B1* | 3/2009 | Rouaix | G06Q 10/06 340/572.1 |
| 7,792,886 B2 | 9/2010 | Hadari et al. | |
| 8,526,929 B1 | 9/2013 | Gilbert et al. | |
| 8,869,053 B2 | 10/2014 | Ehrler et al. | |
| 2008/0077920 A1* | 3/2008 | Faatz | G06Q 10/06 718/100 |
| 2008/0222649 A1* | 9/2008 | Williamson | G06Q 10/06 718/107 |
| 2009/0037241 A1* | 2/2009 | Olsen | G06Q 10/0637 705/7.36 |
| 2014/0025785 A1 | 1/2014 | Zahnow | |
| 2014/0278638 A1 | 9/2014 | Kreuzkamp et al. | |
| 2015/0295877 A1* | 10/2015 | Roman | H04W 4/029 709/203 |
| 2015/0317582 A1* | 11/2015 | Nath | G06Q 10/06 705/7.13 |
| 2016/0078390 A1* | 3/2016 | Grewal | G06Q 10/06398 705/7.42 |

* cited by examiner

*Primary Examiner* — Alan S Miller
*Assistant Examiner* — Mustafa Iqbal
(74) *Attorney, Agent, or Firm* — Harrity & Harrity LLP (57) ABSTRACT

A method for workplace management is provided. The method includes determining a plurality of goals associated with a plurality of tasks to be performed at a workplace, from a database. The method also includes dynamically obtaining task-related information based on a plurality of monitoring parameters associated with the tasks. The method further includes comparing the task-related information with the plurality of goals for monitoring a status of each of the plurality of tasks. The method includes dynamically rendering the status of each of the plurality of tasks on a user interface. The method also includes managing the plurality of tasks to be performed by a plurality of workers based on the status.

20 Claims, 7 Drawing Sheets

SYSTEM AND METHOD FOR WORKPLACE MANAGEMENT

TECHNICAL FIELD

The present disclosure relates to a system and a method for workplace management, and more particularly to a system and a method for streamlining workforce management and providing mobile visibility of workplace activities.

BACKGROUND

The ability to virtually monitor and control different activities performed at a workplace helps in maintaining transparency in workplace management and improving productivity and efficiency of individual employees at the workplace. At times when a task is withheld, a supervisor needs to rush to a corresponding worksite to investigate delay in completion of the withheld task. In the process, other tasks in queue get delayed, thereby affecting an overall productivity of the day. In another scenario, absence or unavailability of workers with desired skill sets at a worksite for an urgent task may also hamper workplace productivity.

For reference, U.S. Pat. No. 7,941,158 describes a system containing a central computer unit having a first database controlled by a first logic unit. At least one mobile computer unit is joined with the mobile equipment. Each of the mobile computer units has a second database controlled by a second logic unit. At least one wireless communication device enables communication between the first logic unit and the second logic unit, wherein the mobile computer unit is operable independent of the first logic unit.

SUMMARY OF THE DISCLOSURE

In one aspect of the present disclosure, a method for workplace management is provided. The method includes determining a plurality of goals associated with a plurality of tasks to be performed at a workplace, from a database. The method also includes dynamically obtaining task-related information based on a plurality of monitoring parameters associated with the tasks. The method further includes comparing the task-related information with the plurality of goals for monitoring a status of each of the plurality of tasks. The method includes dynamically rendering the status of each of the plurality of tasks on a user interface. The method also includes managing the plurality of tasks to be performed by a plurality of workers based on the status.

In another aspect of the present disclosure, a system for workplace management is provided. The system includes a processing unit. The processing unit is configured to obtain a plurality of goals associated with a plurality of tasks to be performed at a workplace, from a database. The processing unit is also configured to dynamically obtain task-related information based on a plurality of monitoring parameters associated with the plurality of tasks. The processing unit is further configured to compare the task-related information with the plurality of goals for monitoring a status of each of the plurality of tasks. The processing unit is configured to dynamically render the status of each of the plurality of tasks on a user interface.

In yet another aspect of the present disclosure, a computer program product is provided. The computer program product includes a non-transitory computer readable storage medium. The computer program product also includes a computer program code embedded in the non-transitory computer readable storage medium. The computer program code is configured to implement a method for workplace management. The method includes obtaining a plurality of goals associated with a plurality of tasks to be performed at a workplace, from a database interface, and managing the tasks to be performed by a plurality of workers based on the status. The method also includes dynamically obtaining task-related information based on a plurality of monitoring parameters associated with the plurality of tasks. The method further includes comparing the task-related information with the plurality of goals for monitoring a status of each of the plurality of tasks. The method includes dynamically rendering the status of each of the plurality of tasks on a user interface. The method also includes managing the plurality of tasks to be performed by a plurality of workers based on the status.

Other features and aspects of this disclosure will be apparent from the following description and the accompanying drawings.

DETAILED DESCRIPTION

Figure 1:
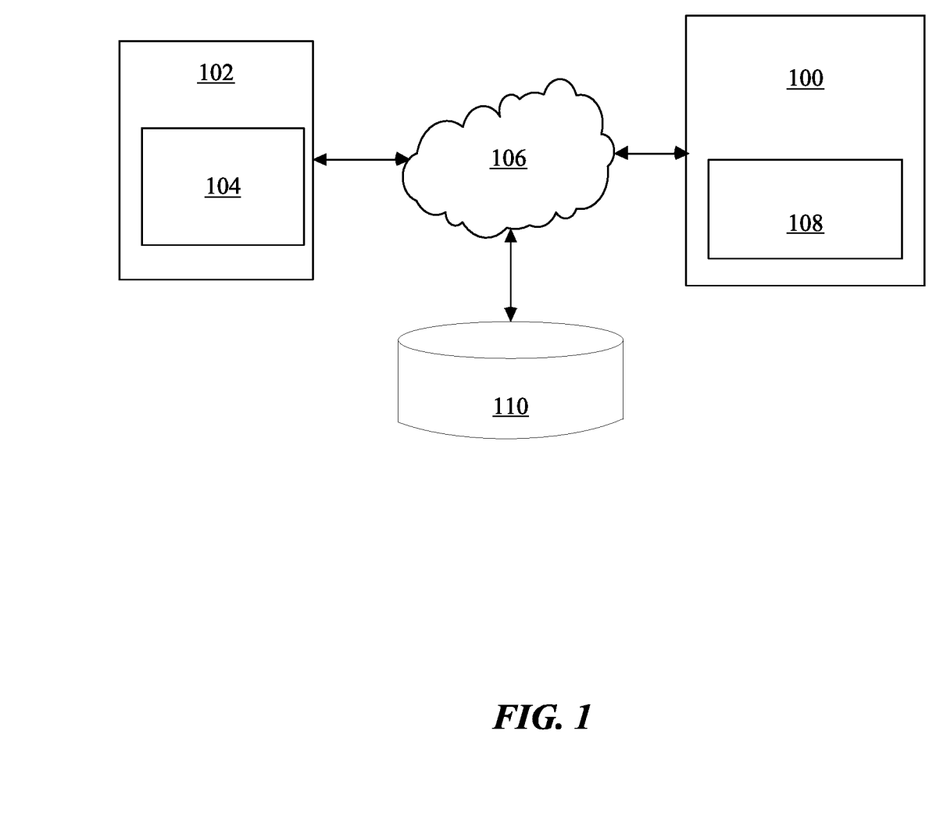
FIG. 1 is a block diagram of a system for workplace management, according to one embodiment of the present disclosure.

Wherever possible, the same reference numbers will be used throughout the drawings to refer to the same or the like parts. FIG. 1 is a block diagram of the system 100 for workplace management, according to one embodiment of the present disclosure. The term "workplace" may refer to a factory, a warehouse, an office building, etc. The system 100 may communicate with a user device 102, such as, a laptop, a tablet, a personal computer, a smartphone, etc., via a network 106, for allowing a user possessing the user device 102 to manage workplace operations. The users may be employees, employers, supervisors, auditors, etc. The network 106 may include, for example, a network that implements Wi-Fi® of Wi-Fi Alliance Corporation, internet, a wide area network (WAN), or mobile communication networks such as a long term evolution (LTE) network, a third generation (3G) network, a fourth generation (4G) network, a ZigBee connection, etc.

In an embodiment, the system 100 may operate, for example, as software as a service (SaaS) or platform as a service (PaaS). The system 100 may provide a responsive user interface 104 that users can access via their respective user devices 102. In an example, the system 100 may provide the user interface 104 implemented as a responsive web application used by a warehouse staff to monitor work progress, worker productivity status, real time status of worker availability, real time status of different areas of a workplace, etc.

The system 100 includes a processing unit 108. The processing unit 108 obtains a number of goals associated with a number of tasks to be performed at a workplace, from a database 110. As used herein, the term "goals" refers to a set of desired results that need to be achieved at a workplace during a predetermined time interval. For example, the goals may include, a predefined number of lines per hour of items to be processed by a worker at a warehouse, material requirements to be fulfilled in a given time slot, a desired productivity rate to be achieved by a worker based on a number of items processed by the worker, etc. The processing unit 108 may determine and assign different tasks to different workers based on the goals. The tasks may include, for example, staff distribution among different locations of the workplace, work distribution among different workers, fulfilling staff requirement, supervision, auditing, inventory management, shipment processing, etc. The database 110 may be, for example, a structured query language (SQL) database, a NoSQL database such as the Microsoft® SQL Server, the Oracle® servers, the MySQL® database, etc. The database 110 may store tasks, goals, worker information, item information, location information, etc. In an embodiment, the system 100 may be deployed in a cloud environment managed by a cloud storage service provider, and the database 110 maybe embodied as a cloud based database implemented in the cloud environment.

The processing unit 108 dynamically obtains task-related information based on a number of monitoring parameters associated with different tasks. The task-related information includes, for example, information of workers, areas, and/or items associated with a number of tasks. The processing unit 108 obtains the task-related information from different data sources, such as, radio frequency (RF) scanners, etc. In an example, the processing unit 108 may obtain the task-related information in real time or periodically at predetermined time intervals. The monitoring parameters include, for example, lines per hour, priority tags associated with a number of tasks, item requirement, route information associated with each item, delivery information, group information associated with each item, worker availability, worker skills, area information, order information, operation information, etc.

In an embodiment, the processing unit 108 may identify a critical task from a number of tasks based on the task-related information. The processing unit 108 assigns a priority tag to the critical task for initiating a completion of the critical task. The priority tag indicates a priority of the critical task among a number of tasks. The processing unit 108 renders the priority tag of the critical task to a user via the user interface 104. In an example, the user interface 104 is a responsive web application interface. Consider an example of a storage warehouse where a critical task of a shipment of 100 items needs to be dispatched within an hour. As the shipment needs to be dispatched within an hour, based on historical data on a number of tasks stored in the database 110, the processing unit 108 determines that the shipment is a critical task. The processing unit 108 retrieves task-related information, such as, item information, workforce requirement, route information, packaging time, delivery time, etc., associated with the shipment from the database 110. The processing unit 108 generates and assigns a priority tag to each item associated with the critical task. The priority tag may be a barcode that contains the task-related information of the critical task. The priority tag is rendered on the user interface 104 to each user associated with the critical task. Based on the task-related information displayed on the user interface 104, the critical task is processed and completed within the determined time.

The processing unit 108 compares the task-related information with respective goals associated with the tasks for monitoring a status of each task. For example, for a particular task of packaging an item, the processing unit 108 obtains task-related information including item identification information, packaging instructions, packaging time, delivery time, etc., from a barcode assigned to the item that is read by a RF scanner. The processing unit 108 tracks the task-related information of the item and compares the task-related information with the goals associated with the task, thereby monitoring a status of the task.

The processing unit 108 dynamically renders the status of each task on the user interface 104. In an example, the user interface 104 may be implemented as a responsive hypertext markup language 5 (HTML5) or a cascading style sheets 3 (CSS3) web design using Bootstrap as a primary user interface library. The processing unit 108 recognizes the user device 102 accessing the system 100, and resizes the user interface 104 displayed on the user device 102 based on a display setting of the respective user device 102. In an example, the user interface 104 maybe integrated with a conventional backend mainframe DB2 services platform to dynamically display, for example, goals, tasks, task-related information, etc., for facilitating workplace management. In an embodiment, the processing unit 108 tracks the status of each task, and updates the goals associated with each task stored in the database 110, based on the tracked status.

In an example, different colored indicators may be used to indicate the status of tasks or performance of workers. For example, a green indicator may be used to indicate that a worker has completed assigned tasks, is available to perform additional tasks, or has no task assigned. In another example, the green indicator may also indicate that a task is completed. In another example, a red indicator may indicate that a worker is behind target on completing assigned task(s), workers are unavailable to perform tasks, items are unavailable to complete a task, a task is left unattended, etc. Consider an example where a green indicator displays that a worker is available for a new task at a delivery worksite of a workplace. A supervisor checks for queued delivery tasks highlighted in green indicators on the user interface 104, and assigns a delivery task to the worker. If the worker is assigned another task by another supervisor instantly, a red indicator is rendered against the worker's name on the user interface 104. The supervisor then re-assigns the queued delivery task to another available worker. Hence, the system 100 allows a user to check availability of workers at a worksite and facilitate re-assignment of tasks among the workers.

The processing unit 108 manages a number of tasks to be performed by a number of workers based on the status of each task. In one example, the processing unit 108 may render an incomplete status of a first task by a first worker on the user interface 104, and re-assign the first task to a second worker of the number of workers. In another example, the processing unit 108 may render a complete status of a second task by a third worker on the user interface 104, and assign a third task to the third worker.

The processing unit 108 of the system 100 may store a computer program product in one or more non-transitory computer readable medium(s). Common forms of computer readable media include, for example, a floppy disk, a flexible disk, hard disk, magnetic tape, or any other magnetic medium, a CD-ROM, DVD, any other optical medium, or any other medium. Further, the computer readable medium may have a computer readable program code stored therein. The computer readable program code may store and execute instructions for workplace management.

The processing unit 108 may be a microprocessor or other processor known in the art. The processing unit 108 may embody a single microprocessor or a number of microprocessors for receiving signals from components of the system 100. Numerous commercially available microprocessors may be embodied to perform the functions of the processing unit 108. A person of ordinary skill in the art will appreciate that the processing unit 108 may additionally include other components and may also perform other functions not described herein.

Consider an example where delivery tasks at a workplace are managed by a supervisor. The supervisor accesses the system 100 via a web application user interface 104 rendered on his/her user device 102. The processing unit 108 provides a notification to the supervisor indicating a delivery task of outbound items at a particular time. A list of available workers at the delivery worksite is displayed on the user interface 104. The supervisor selects one or more workers from the list required for the delivery task. Goals associated with the delivery task are retrieved from the database 110. Information of the delivery task and associated goals are displayed to the supervisor and the workers via the user interfaces 104 displayed on the respective user devices 102. The system 100 dynamically receives task-related information, such as, number of outbound items loaded to a vehicle, lines per hour completed by each worker, etc., from RF scanners installed at the delivery worksite indicating a status of the task assigned to each worker. The tracked status is rendered on the user interface 104 of the supervisor's user device 102, thereby allowing the supervisor to track and monitor progress of the delivery task.

Figure 2:
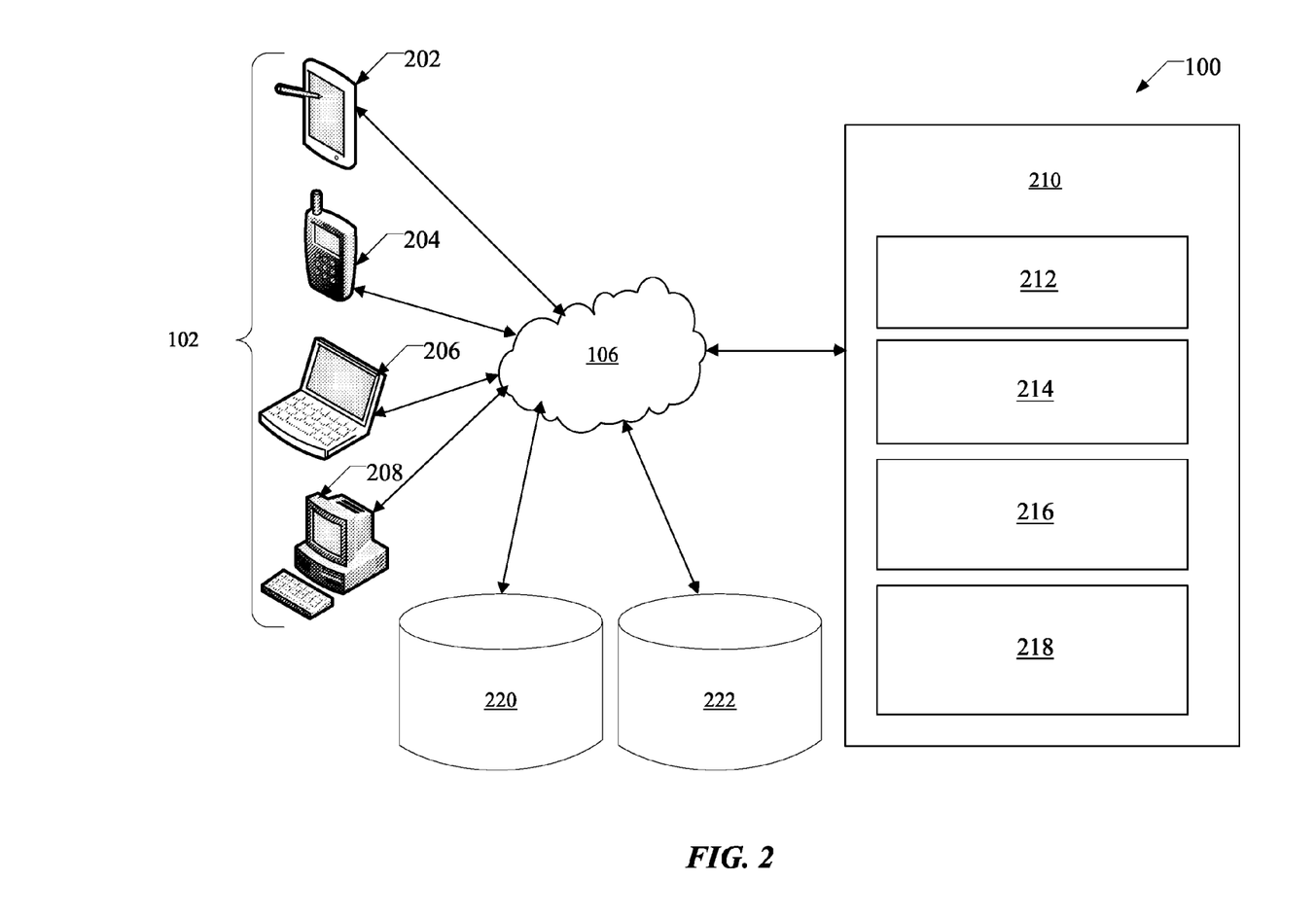
FIG. 2 is a block diagram of the system for workplace management, according to another embodiment of the present disclosure.

FIG. 2 is a block diagram of the system 100 for workplace management, according to another embodiment of the present disclosure. The system 100 provides a warehouse operations web platform 210 that communicates with the number of user devices 102, such as, a tablet 202, a smartphone 204, a laptop 206, a personal computer 208, etc., via the network 106. The warehouse operations web platform 210 includes a corporate web security (CWS) layer 212, a warehouse operations web application 214, a warehouse operations services layer 216, and a warehouse operations data access object (DAO) layer 218. The CWS layer 212 is an authentication and authorization layer that allows only authorized users to gain access to the warehouse operations web platform 210. The CWS layer 212 determines authorization privileges associated with each user and authenticate user access based on the authorization privileges. In an example, information associated with the respective authorization privileges of users is stored in the warehouse operations database 220. The CWS layer 212 may provide user identification information associated with users, such as, warehouse employees, supervisors, auditors, etc. The warehouse operations web platform 210 provides the warehouse operations web application 214 to users to access the warehouse operations web platform 210 via the network 106. The warehouse operations web application 214 is embodied as a productivity application accessible by a user device, such as, a smartphone for facilitating real time monitoring of work progress, productivity, area status, etc.

The warehouse operations services layer 216 provides an application programing interface (API) embodied to manage operations, administration, and maintenance of the warehouse operations web platform 210. The warehouse operations services layer 216 functions as an abstraction layer that performs management of operations of the CWS layer 212, the warehouse operations web application 214, and the warehouse operations DAO layer 218, manages communication of these layers 212, 214, and 216 with external systems, such as, the warehouse operations database 220 and the warehouse feeder database 222, manages configuration activities of the warehouse operations web platform 210, etc. The warehouse operations DAO layer 218 provides an interface between the warehouse operations web platform 210 and the databases including the warehouse operations database 220 and the warehouse feeder database 222. The warehouse operations DAO layer 218 allows different data operations associated with the warehouse operations database 220 and the warehouse feeder database 222 without exposing details of the warehouse operations database 220 and the warehouse feeder database 222. The warehouse operations database 220 stores information associated with workers, goals, tasks, etc. The warehouse feeder database 222 is embodied to dynamically or periodically store task-related information, such as, location of items, scanned data associated with each item at different stages of a task, etc.

Figure 3:
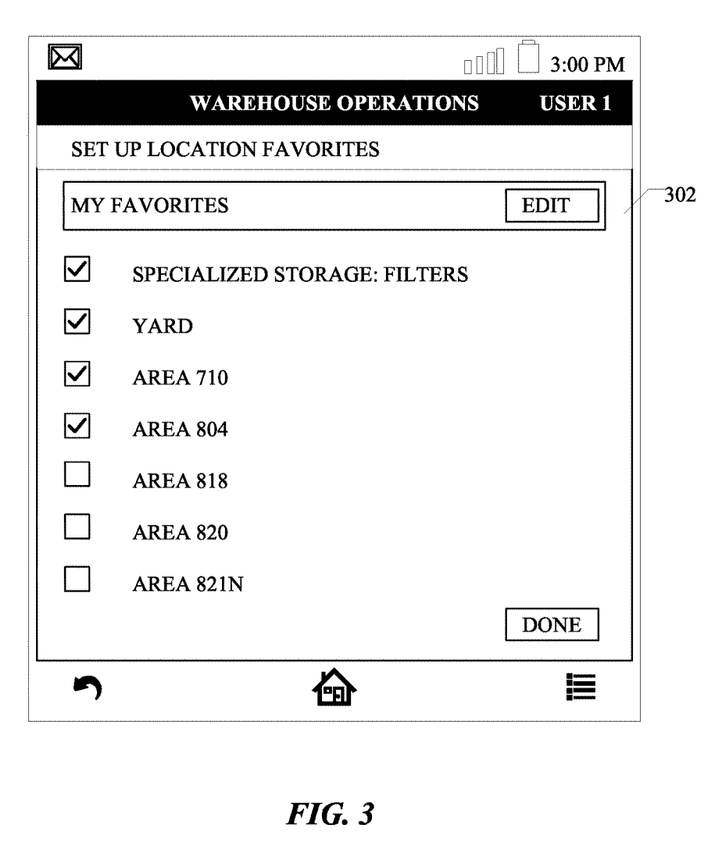
FIG. 3 illustrates an exemplary user interface showing location preferences selected by a worker, according to one embodiment of the present disclosure.

FIG. 3 illustrates an exemplary user interface 302 showing location preferences selected by a worker, according to one embodiment of the present disclosure. A worker can preset desired locations to work at a workplace, such as a factory, as exemplarily illustrated in FIG. 3. A list of available locations at the workplace that require workers is displayed on the user interface 302. The worker may select one or more of the displayed locations via the user interface 302, and save the selected locations as favorites. As soon as tasks associated with the selected locations are received, the workers that are assigned the tasks are notified.

Figure 4:
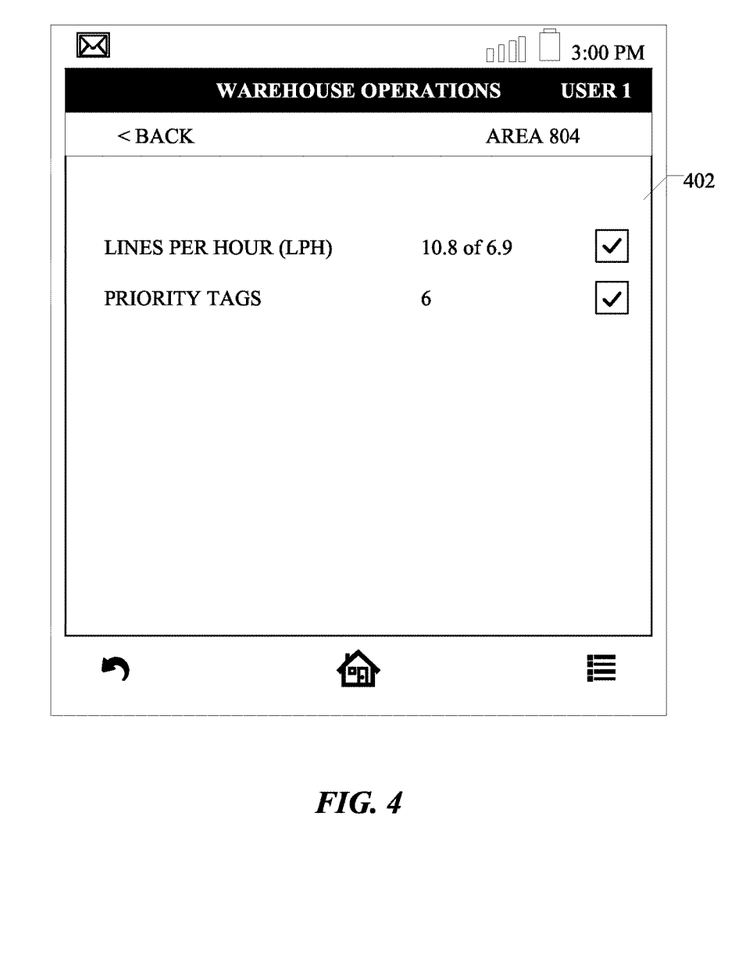
FIG. 4 illustrates an exemplary user interface showing real time status indicators associated with a location at a workplace, according to one embodiment of the present disclosure.

FIG. 4 illustrates an exemplary user interface 402 showing real time status indicators associated with a location at a workplace, according to one embodiment of the present disclosure. For example, when the worker selects a location, such as, area 804, status indicators are displayed on the user interface 402 that indicate a real time status of the location, for example, priority tags, lines per hour requirements, etc. In one example, the lines per hour requirement are 10.8 of 6.9 and the priority tags are 6 associated with area 804.

Figure 5:
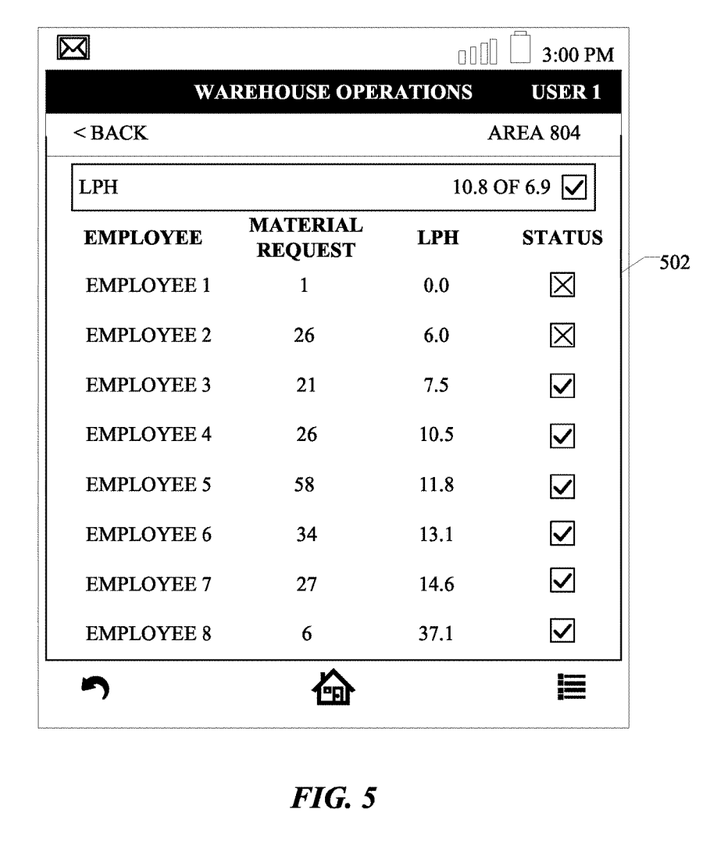
FIG. 5 illustrates an exemplary user interface showing lines per hour status of a location at a workplace, according to one embodiment of the present disclosure.

FIG. 5 illustrates an exemplary user interface 502 showing lines per hour status of a location at a workplace, according to one embodiment of the present disclosure. A list of employees working at the location, area 804 along with a real time status of the lines per hour requirement associated with location is displayed on the user interface 502. The list displays information associated with a task, such as, material requirements and lines per hour requirement associated with each employee, and a real time status of lines per hour goal achieved by each employee. A cross symbol associated with an employee indicates that the employee has not met the lines per hour target assigned to him or her, while a tick symbol indicates that the employee has achieved his or her lines per hour target and may be ahead of the assigned target.

Figure 6:
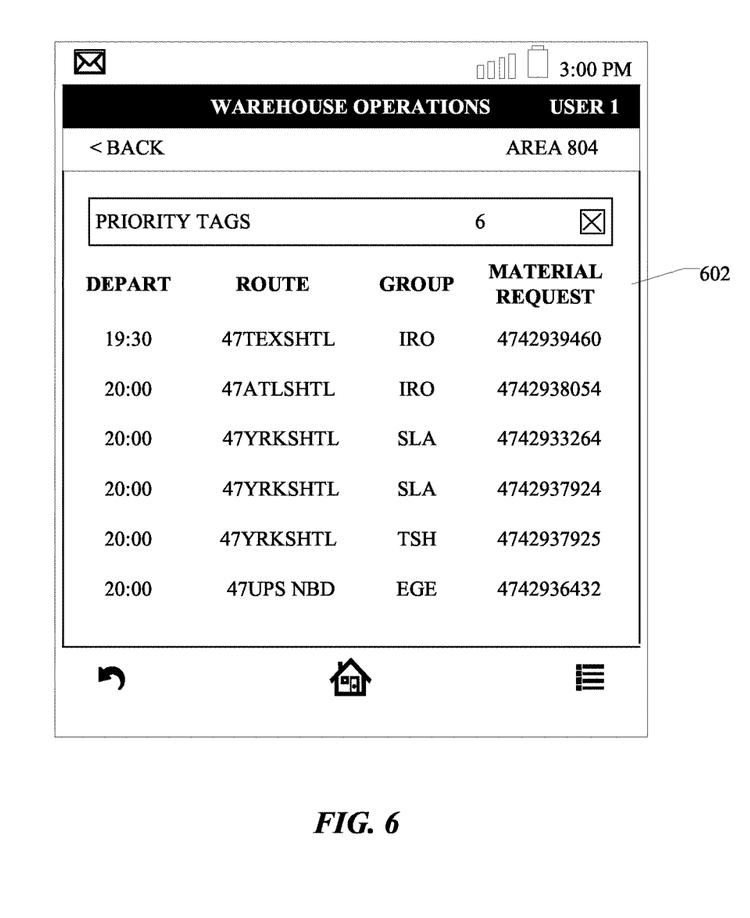
FIG. 6 illustrates an exemplary user interface showing priority tags assigned to different tasks associated with a location of a workplace, according to one embodiment of the present disclosure.

FIG. 6 illustrates an exemplary user interface 602 showing priority tags assigned to different tasks associated with a location of a workplace, according to one embodiment of the present disclosure. When there are a number of tasks at a workplace that need to be completed on a priority basis, priority tags are assigned to the critical tasks, so that workers associated with the critical tasks are notified of the same, thereby ensuring completion of the critical tasks on time, over the remaining tasks. The user interface 602 exemplarily illustrated in FIG. 6 displays a list of critical tasks assigned with the priority tags, and task-related information of the critical tasks, such as, route information, group information, material requirements, etc.

Industrial Applicability

The present disclosure relates to the system 100 for workplace management. The system 100 can be used to remotely monitor work progress, individual productivity of workers, and/or status of different worksites of a workplace in real time. The system 100 facilitates streamlining of workforce at the workplace and provides remote visibility of changes to inbound and/outbound orders at the workplace. With the help of the system 100, high priority orders or projects may be processed at priority, thereby ensuring completion of these high priority, critical tasks on time. In cases when there is a shortage of workforce for a particular task at a particular worksite, available workers may be assigned the task to save time and ensure completion of the task at a stipulated time for the task. Hence, the system 100 allows efficient and effective redistribution of workforce to achieve desired goals at the workplace.

Figure 7:
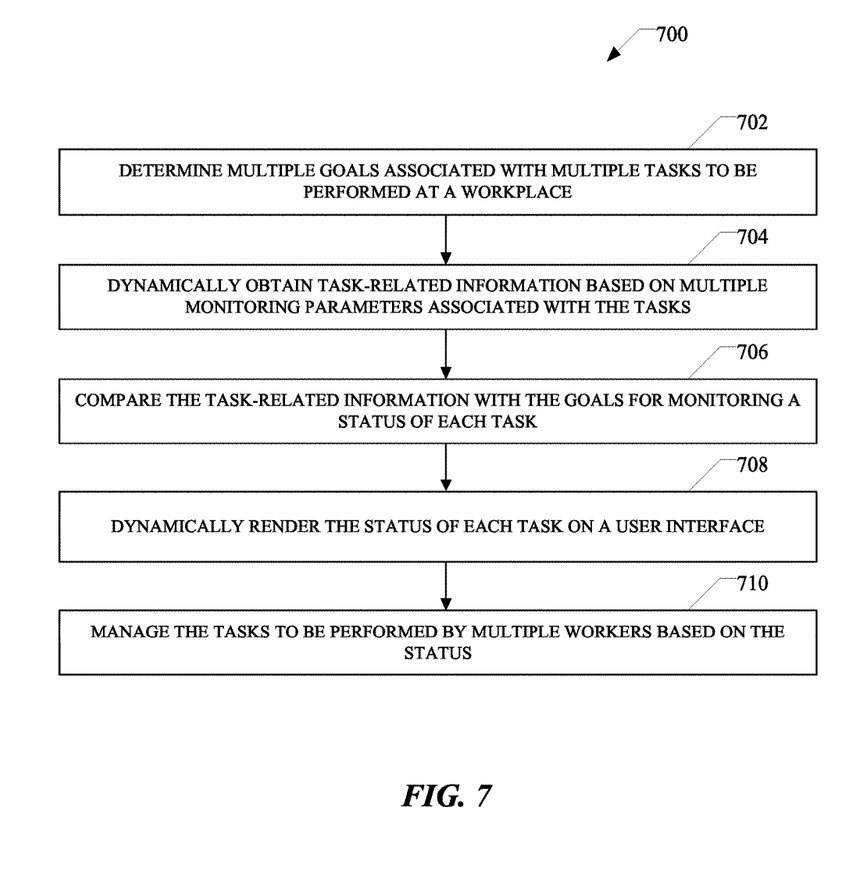
FIG. 7 is a flowchart for a method for workplace management, according to one embodiment of the present disclosure.

FIG. 7 is a flowchart for a method 700 for workplace management, according to one embodiment of the present disclosure. At step 702, the number of goals associated with the number of tasks to be performed at the workplace is determined. The goals are obtained from the database 110, 220.

At step 704, the task-related information based on the number of monitoring parameters associated with the tasks is dynamically obtained. The task-related information includes, for example, information of workers, areas, items associated with the number of tasks, etc. The monitoring parameters include, for example, lines per hour, priority tags associated with the number of tasks, item requirement, route information associated with each item, delivery information, group information associated with each item, worker availability, worker skills, area information, order information, operation information, etc. In an embodiment, a critical task from the number of tasks is identified based on the task-related information. The priority tag is assigned to the critical task for initiating a completion of the critical task. The priority tag indicates the priority of the critical task among the number of tasks. The priority tag of the critical task is rendered via the user interface 402, 602.

At step 706, the task-related information is compared with the goals for monitoring the status of each task. In an embodiment, the status of each task is tracked. The number of goals associated with each task stored in the database 110, 220 is updated based on the tracked status. At step 708, the status of each task is dynamically rendered on the user interface 302, 402, 502, 602.

At step 710, the tasks to be performed by the number of workers are managed based on the status. In an embodiment, the management of each task includes rendering the incomplete status of the first task of the number of tasks by the first worker of the number of workers on the user interface 502, and re-assigning the first task to the second worker of the number of workers. In another embodiment, the management of each task includes rendering the complete status of the second task of the number of tasks by the second worker on the user interface 502 and assigning the third task of the number of tasks to the second worker.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method comprising:
   determining, by one or more processors of a system, a plurality of goals associated with a plurality of tasks by using a data access object layer that provides an interface with a warehouse operations database without exposing first details of the warehouse operations database,
   the warehouse operations database storing information associated with the plurality of goals, and
   the data access object layer allowing different data operations associated with the warehouse operations database and a warehouse feeder database without exposing the first details of the warehouse operations database and second details of the warehouse feeder database;
   dynamically obtaining, by the one or more processors of the system and from RF scanners installed at one or more delivery worksites, task-related information based on a plurality of monitoring parameters associated with the plurality of tasks;
   dynamically, by the one or more processors of the system and on a user interface of a user device, rendering a status of a task, of the plurality of tasks, based on the plurality of goals and the task-related information,
   the system and the user device being connected via one or more networks; and
   managing the plurality of tasks to be performed by a plurality of workers based on the status.

2. The method of claim 1, wherein managing the plurality of tasks comprises:
   rendering, on the user interface, an incomplete status of a first task, of the plurality of tasks, assigned to a first worker of the plurality of workers; and
   re-assigning the first task to a second worker of the plurality of workers.

3. The method of claim 1, wherein managing the plurality of tasks comprises:
   rendering, on the user interface, a complete status of a second task, of the plurality of tasks, assigned to a second worker; and
   assigning a third task, of the plurality of tasks, to the second worker.

4. The method of claim 1, further comprising:
   identifying a critical task, from the plurality of tasks, based on the task-related information;
   assigning a priority tag to the critical task for initiating a completion of the critical task,
   wherein the priority tag is configured to indicate a priority of the critical task among the plurality of tasks; and
   rendering the priority tag of the critical task via the user interface.

5. The method of claim 1, further comprising:
   tracking the status of the task; and
   updating the plurality of goals based on the tracked status.

6. The method of claim 1, wherein the plurality of monitoring parameters comprise at least one of lines per hour, priority tags associated with the plurality of tasks, item requirement, route information, delivery information, group information, worker availability, worker skills, area information, order information, or operation information.

7. The method of claim 1, wherein the task-related information comprises information of at least one of workers, areas, or items associated with the plurality of tasks.

8. A system for workplace management, the system comprising:
   a memory; and
   a processing unit configured to:
      obtain information identifying a plurality of goals, associated with a plurality of tasks, by using a data access object layer that provides an interface with a warehouse operations database without exposing first details of the warehouse operations database,
         the warehouse operations database storing information associated with the plurality of goals, and
         the data access object layer allowing different data operations associated with the warehouse operations database and a warehouse feeder database without exposing the first details of the warehouse operations database and second details of the warehouse feeder database;
      dynamically obtain, from RF scanners installed at one or more delivery worksites, task-related information based on a plurality of monitoring parameters associated with the plurality of tasks;
      dynamically render, on a user interface, a status of a task, of the plurality of tasks, based on the plurality of goals and the task-related information; and
      manage the plurality of tasks to be performed by a plurality of workers based on the status.

9. The system of claim 8, wherein, when managing the plurality of tasks, the processing unit is configured to:
   render, on the user interface, an incomplete status of a first task, of the plurality of tasks, assigned to a first worker of the plurality of workers; and
   re-assign the first task to a second worker of the plurality of workers.

10. The system of claim 8, wherein, when managing the plurality of tasks, the processing unit is configured to:
    render, on the user interface, an incomplete status of a first task, of the plurality of tasks, assigned to a first worker of the plurality of workers; and
    assign a third task, of the plurality of tasks, to a second worker.

11. The system of claim 8, wherein the processing unit is further configured to:
    identify a critical task, from the plurality of tasks, based on the task-related information;
    assign a priority tag to the critical task for initiating a completion of the critical task,
       wherein the priority tag is configured to indicate a priority of the critical task among the plurality of tasks; and
    render the priority tag of the critical task via the user interface.

12. The system of claim 8, wherein the processing unit is further configured to:
    track the status of the task; and
    update the plurality of goals based on the tracked status.

13. The system of claim 8, wherein the plurality of monitoring parameters comprise at least one of lines per hour, priority tags associated with the plurality of tasks, item requirement, route information, delivery information, group information, worker availability, worker skills, area information, order information, or operation information.

14. The system of claim 8, wherein the task-related information comprises information of at least one of workers, areas, or items associated with the plurality of tasks.

15. A non-transitory computer readable storage medium comprising:
    one or more instructions that, when executed by at least one processor, cause the at least one processor to:
       obtain information identifying a plurality of goals, associated with a plurality of tasks, by using a data access object layer that provides an interface with a warehouse operations database without exposing first details of the warehouse operations database,
          the warehouse operations database storing information associated with the plurality of goals, and
          the data access object layer allowing different data operations associated with the warehouse operations database and a warehouse feeder database without exposing the first details of the warehouse operations database and second details of the warehouse feeder database;
       dynamically obtain, from RF scanners installed at one or more delivery worksites, task-related information based on a plurality of monitoring parameters associated with the plurality of tasks;
       dynamically render, on a user interface, a status of a task, of the plurality of tasks, based on the plurality of goals and the task-related information; and
       manage the plurality of tasks to be performed by a plurality of workers based on the status.

16. The non-transitory computer readable storage medium of claim 15, where the one or more instructions to manage each of the plurality of tasks comprise:
    one or more instructions that, when executed by the at least one processor, cause the at least one processor to:
       render, on the user interface, an incomplete status of a first task, of the plurality of tasks, assigned to a first worker of the plurality of workers; and
       re-assign the first task to a second worker of the plurality of workers.

17. The non-transitory computer readable storage medium of claim 15, where the one or more instructions to manage each of the plurality of tasks comprise:
    one or more instructions that, when executed by the at least one processor, cause the at least one processor to:
       render, on the user interface, a complete status of a second task of the plurality of tasks by a second worker on a user interface; and
       assign a third task of the plurality of tasks to the second worker.

18. The non-transitory computer readable storage medium of claim 15, further comprising:
    one or more instructions that, when executed by the at least one processor, cause the at least one processor to:
       identify a critical task, from the plurality of tasks, based on the task-related information;
       assign a priority tag to the critical task for initiating a completion of the critical task, wherein the priority tag is configured to indicate a priority of the critical task among the plurality of tasks; and
       render the priority tag of the critical task via the user interface.

19. The non-transitory computer readable storage medium of claim 15, further comprising:
    one or more instructions that, when executed by the at least one processor, cause the at least one processor to:

track the status of the task; and
update the plurality of goals based on the tracked status.

20. The method of claim 1, wherein the warehouse feeder database periodically stores the task-related information.

* * * * *